(12) United States Patent
Griffin

(10) Patent No.: US 12,235,981 B2
(45) Date of Patent: *Feb. 25, 2025

(54) DETERMINING THE RELATIVE RISK FOR USING AN ORIGINATING IP ADDRESS AS AN IDENTIFYING FACTOR

(71) Applicant: Truist Bank, Charlotte, NC (US)

(72) Inventor: Jeffrey Jason Griffin, Garner, NC (US)

(73) Assignee: Truist Bank, Charlotte, NC (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/714,417

(22) Filed: Apr. 6, 2022

(65) Prior Publication Data

US 2022/0229927 A1     Jul. 21, 2022

Related U.S. Application Data

(63) Continuation of application No. 16/562,646, filed on Sep. 6, 2019, now Pat. No. 11,347,879.

(Continued)

(51) Int. Cl.
  *G06F 21/31*    (2013.01)
  *G06F 21/45*    (2013.01)
  (Continued)

(52) U.S. Cl.
  CPC ...... *G06F 21/6218* (2013.01); *H04L 63/0876* (2013.01)

(58) Field of Classification Search
  None
  See application file for complete search history.

(56) References Cited

U.S. PATENT DOCUMENTS 5,548,273 A * 8/1996 Nicol ............... G01P 1/127
                                                 340/439
8,131,704 B2 * 3/2012 Kim ................ H04L 61/35
                                                 707/706

(Continued)

FOREIGN PATENT DOCUMENTS

| CN | 112149093 | 12/2020 |
| TW | 201446018 | 12/2014 |

OTHER PUBLICATIONS

An Interoperable Identity Management Solution for Kenya E-Government. Alemayehu (Year: 2011).*

(Continued)

*Primary Examiner* — Venkat Perungavoor
(74) *Attorney, Agent, or Firm* — Kilpatrick Townsend & Stockton LLP; Michael A. Springs, Esq.

(57) ABSTRACT

A relative risk can be determined using an originating Internet Protocol (IP) address as an identifying factor for purposes of authenticating a user. The originating IP address can be used as an identifying factor for a particular user account to determine potentially fraudulent activity and reduce the risk of fraud. This additional identifying factor can be used as a part of an overall authentication platform to help screen fraud attempts and to authenticate valid and non-fraudulent users. Using certain aspects can distinguish whether originating IP addresses are public or private. Some examples can track and match originating IP addresses to user accounts and also can keep track of recently active sessions for each IP address.

18 Claims, 3 Drawing Sheets

Related U.S. Application Data

(60) Provisional application No. 62/728,227, filed on Sep. 7, 2018.

(51) Int. Cl.
  *G06F 21/62* (2013.01)
  *H04L 9/40* (2022.01)
  *G06F 21/71* (2013.01)

(56) References Cited

U.S. PATENT DOCUMENTS

| | | | |
|---|---|---|---|
| 9,237,146 | B1 | 1/2016 | Casillas et al. |
| 9,390,384 | B2 | 7/2016 | Eisen |
| 10,405,186 | B1* | 9/2019 | Latsha .................. H04W 8/183 |
| 10,645,086 | B1* | 5/2020 | Hadler .................. H04L 63/083 |
| 10,878,218 | B2 | 12/2020 | Whelan, III et al. |
| 11,108,752 | B2 | 8/2021 | Maxwell |
| 2002/0083178 | A1 | 6/2002 | Brothers |
| 2005/0246765 | A1* | 11/2005 | Utsumi ............ G11B 20/00702 726/5 |
| 2006/0041756 | A1* | 2/2006 | Ashok ..................... G06F 21/31 726/26 |
| 2006/0106944 | A1 | 5/2006 | Shahine et al. |
| 2007/0143626 | A1* | 6/2007 | Okuda ..................... G06F 21/46 713/183 |
| 2009/0083540 | A1* | 3/2009 | Kim .................. H04N 21/4183 713/156 |
| 2009/0300734 | A1* | 12/2009 | Hiramoto ................ G06F 21/31 726/5 |
| 2010/0107228 | A1 | 4/2010 | Lin |
| 2010/0185845 | A1* | 7/2010 | Takayama ............. G06F 21/575 713/189 |
| 2011/0016327 | A1 | 1/2011 | Suzuki et al. |
| 2013/0061299 | A1* | 3/2013 | Novak .................. H04L 63/068 726/6 |
| 2013/0061301 | A1* | 3/2013 | Novak ................ H04L 63/0846 726/6 |
| 2015/0067804 | A1 | 3/2015 | Maxwell |
| 2015/0163217 | A1* | 6/2015 | Lo ......................... H04L 51/212 707/748 |
| 2015/0237038 | A1 | 8/2015 | Grajek et al. |
| 2015/0326564 | A1* | 11/2015 | Wang ................. H04L 63/0823 726/6 |
| 2015/0341341 | A1* | 11/2015 | Messerges ................ H04L 9/32 713/151 |
| 2017/0085388 | A1* | 3/2017 | Fort ........................ G06F 21/84 |
| 2017/0279619 | A1* | 9/2017 | Yang ..................... H04L 9/3268 |
| 2018/0034646 | A1* | 2/2018 | Kuramoto ............ H04L 9/3268 |
| 2018/0205734 | A1 | 7/2018 | Wing et al. |
| 2019/0392450 | A1 | 12/2019 | Gosset et al. |
| 2020/0036703 | A1 | 1/2020 | Håkansson et al. |
| 2021/0152537 | A1* | 5/2021 | Bengani ................ H04L 63/123 |
| 2022/0309148 | A1* | 9/2022 | Streuter ................. G06F 21/44 |
| 2022/0353256 | A1* | 11/2022 | Cizer Kobrinsky .. H04L 63/102 |

OTHER PUBLICATIONS

Fingerprinting the Fingerprinters: Learning to Detect Browser Fingerprinting Behaviors. Iqbal. IEEE. (Year: 2021).*

Pegasus: a distributed and load-balancing fingerprint identification system. Zhao. FITEE. (Year: 2016).*

U.S. Appl. No. 16/562,646 , Non-Final Office Action, Mailed on Sep. 10, 2021, 16 pages.

U.S. Appl. No. 16/562,646 , Notice of Allowance, Mailed on Feb. 22, 2022, 10 pages.

Bakar et al., "Context-Aware Analysis for Adaptive Unified Authentication Platform", International Conference on Computing and Informatics, Aug. 2015, 6 pages.

Chomsiri , "Sniffing Packets on LAN without ARP Spoofing", IEEE, Third 2008 International Conference on Convergence and Hybrid Information Technology, 2008, pp. 472-477.

Fukuda et al., "A Technique for Counting DNSSEC Validators", 2013 Proceedings IEEE Infocom, Apr. 2013.

Hewamadduma , "Detection and Prevention of Possible Unauthorized Login Attempts through Stolen Credentials from a Phishing Attack in an Online Banking System", IEEE, 2017 International Conference on Research and Innovation in Information Systems (ICRIIS), Jul. 2017.

Kang et al., "Advanced White List Approach for Preventing Access to Phishing Sites", IEEE, 2007 International Conference on Convergence Information Technology (ICCIT 2007), 2007, pp. 491-496.

Luangmaneerote et al., "Inhibiting Browser Fingerprinting and Tracking", IEEE BigDataSecurity/HPSC/IDS 2017, Feb. 2017.

Unger et al., "SHPF: Enhancing HTTP(S) Session Security with Browser Fingerprinting", Availability, Reliability and Security (ARES), IEEE, Sep. 2013.

Yen et al., "Host Fingerprinting and Tracking on the Web: Privacy and Security Implications", The 19th Annual Network and Distributed System Security Symposium, Feb. 2012, 16 pages.

* cited by examiner

DETERMINING THE RELATIVE RISK FOR USING AN ORIGINATING IP ADDRESS AS AN IDENTIFYING FACTOR

CROSS-REFERENCE TO RELATED APPLICATION

This is a continuation of U.S. Ser. No. 16/562,646, titled "Determining the Relative Risk for Using an Originating IP Address as an Identifying Factor" as filed Sep. 6, 2019, which claims priority to U.S. Ser. No. 62/728,227, titled "Determining the Relative Risk for Using an Originating IP Address as an Identifying Factor" and filed Sep. 7, 2018, both of which are incorporated by reference herein in their entirety.

TECHNICAL FIELD

The present disclosure relates generally to controlling access to data on a computer network. More particularly, but not exclusively, the present disclosure relates to determining an authentication level for a user.

BACKGROUND

The growth of online interactions between users and service providers presents increasing challenges to determining that a request made to a server device is authentic to the user indicated. Various authentication processes have been developed with a goal to authenticate the user accurately. But, often the authentication processes are either overly burdensome to users or involve risks by which unscrupulous users can be inaccurately authenticated. Or, a more burdensome authentication process is implemented after a user provides information in response to a less burdensome authentication process. Authentication processes are often implemented without any assessment about an initial request for access, thus subjecting users to more burdensome authentication processes than is necessary and clogging network bandwidth by exchanging various information with the user via the communication channel. As online interactions continue to increase, the more burdensome authentication process results in a strain on network bandwidth and server devices risk system failures, degraded operating modes, or system conditions that pose risks for data losses. And, using a configuration that uses a less burdensome process risks data loss or compromise at unacceptable levels.

SUMMARY

In one example, a server device includes a processor device and a non-transitory computer readable medium. The non-transitory computer readable medium includes a data store and a control access module. The data store is configured to store a plurality of stored IP addresses from which users have made requests to access the stored data. The control access module is executable by the processor to increment a value associated with an IP address in response to a request to access the stored data from a user from that IP address. The control access module is executable by the processor to decrement the value associated with the IP address in response to a subsequent request from the user from a different IP address to access the stored data. The control access module is executable by the processor to use the value associated with the IP address to determine an authentication level for the user.

In another example, a method of determining an authentication level includes storing, on a server device, a plurality of Internet Protocol (IP) addresses from which users have made requests via an IP network to access stored data. The method also includes incrementing, by the server device, a value associated with an IP address in response to receiving a request to access the stored data from a user from that IP address. The method also includes decrementing the value associated with the IP address in response to receiving a subsequent request from the user from a different IP address to access the stored data. The method also includes determining an authentication level for the user by using the value associated with the IP address.

In a further example, a non-transitory computer readable medium includes a processor device. The non-transitory computer readable medium includes an authentication determination subsystem and a credential authentication system. The authentication determination subsystem includes a data store configured to store a plurality of stored IP addresses from which users have made requests to access the stored data. The authentication determination subsystem includes a control access module that is executable by a processor to increment a value associated with an IP address in response to a request to access the stored data from a user from that IP address, to decrement the value associated with the IP address in response to a subsequent request from the user from a different IP address to access the stored data, and to use the value associated with the IP address to determine an authentication level for the user. The credential authentication system includes a data store configured to store a plurality of user authentication credentials and a credential verification module that is executable by the processor to seek to authenticate a user using procedures in accordance with the authentication level determined by the control access module of the authentication determination subsystem.

DETAILED DESCRIPTION

Figure 1:
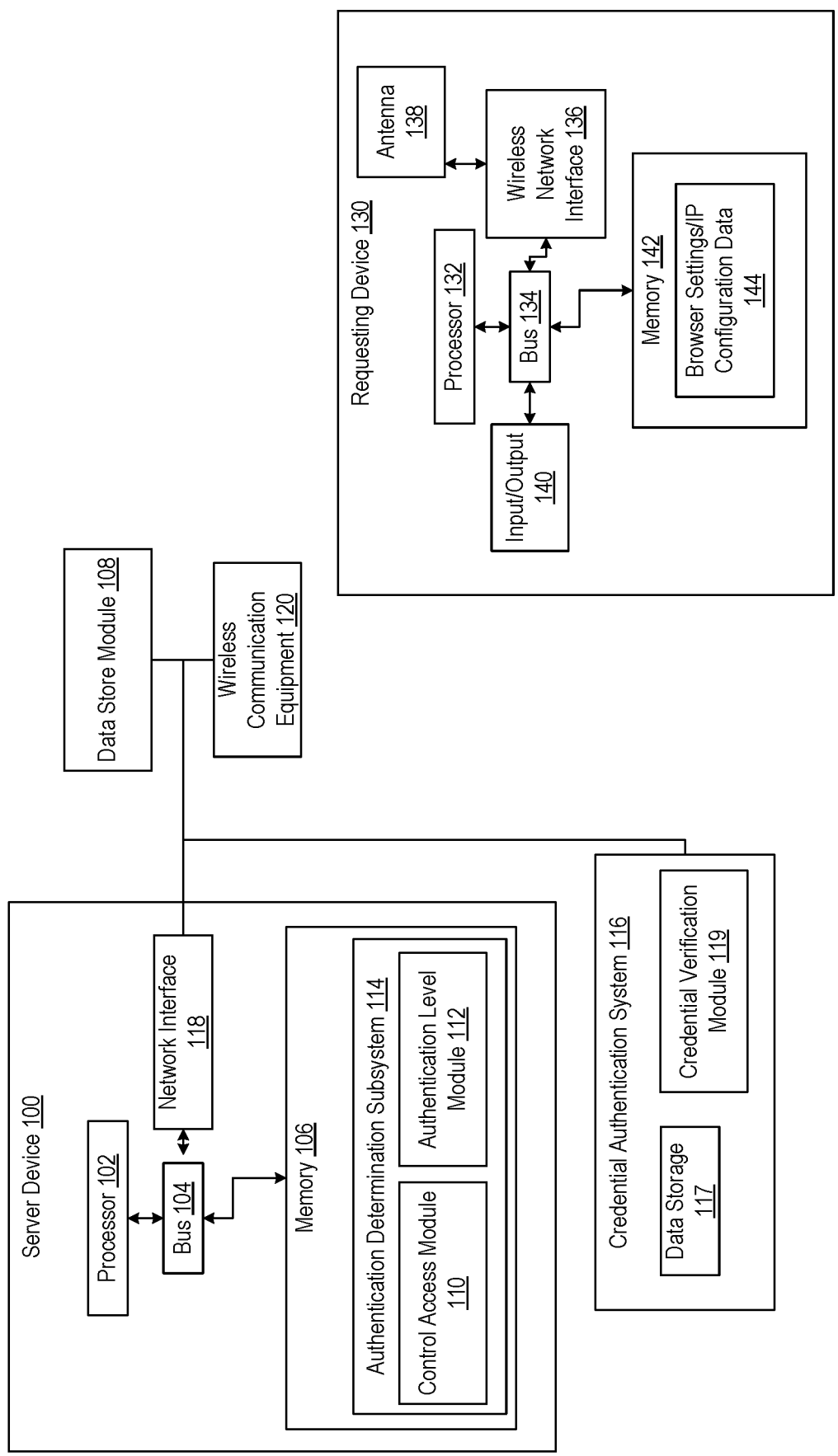
FIG. 1 is a block diagram of a computing environment for determining an authentication level for a user based on an IP address of the request to access data according to some aspects of the disclosure.

Certain aspects and features relate to determining an authentication level for a request to access data, by using an originating Internet Protocol (IP) address to determine the authentication level. An authentication level can include the authentication process that is selected to be used to authenticate the user that is making the request to access the data. For example, the possible levels may include one level that does not involve having the user provide much, if any, information to authenticate the user, another level that involves receiving more information from the user than the first level to authenticate the user, and a further level that involves multiple steps and multiple requests for information from the user to authenticate the user. The originating IP address can be used as a factor for determining an authentication level to implement for a particular request to access data. By doing so, a proper authentication process can be implemented that both prevents fraud, while avoiding overburdening the user and the network to authenticate the user.

In one example, a request to access data associated with a user account can be received. The request can be from an IP address. A system can increment a value associated with the IP address in response to a request to access the stored data from a user from that IP address. If a subsequent request is received to access data associated with the user account from a different IP address, the system can decrement the value associated with the IP address. The value can be used to determine the authentication level for the user. For example, a user that often or always requests access from a home device associated with the same IP address may end up being authenticated by a less burdensome authentication process than if the user requests access from a new IP address or requests access from multiple different accesses. Since the user that often or always requests access from the home device has been authenticated successfully in previous request sessions, the system can consider subsequent requests from the user from that same IP address as being lower risk as compared to a request from a new IP address.

Determining the relative risk for using an originating IP address as an identifying factor for purposes of authenticating a user can include capturing the originating IP address prior to allowing access to user data or prior to a user entering authentication information. Other identifying information attributed with a user or a user's device or devices can be obtained. For example, browser settings attributed to a particular device and particular user may be obtained when a user is attempting to login to an account via a username and password exchange. The browser settings, which can be obtained before, during, or after a login attempt, can then be stored in conjunction with a corresponding IP address. Depending on whether the browser settings of a particular user correspond to a username or account, a number of processes may be performed to determine (i) whether the user needs to be authenticated, (ii) the level of authentication required, (iii) whether the IP address needs to be stored or updated, and (iv) whether an IP address counter should be incremented or decremented.

In some examples, a list of IP addresses can be stored and updated. The list can be updated to include a new IP address when a user from a plurality of users attempts to access data that is accessible via an IP network. Each IP address from the plurality of IP addresses within the list can be associated with a counter. The counter attributed to a single IP address can be incremented or decremented depending on the user activity associated with that particular IP address. The counter associated with each IP address can be used to determine a characteristic that can be commonly associated with fraud or malicious software.

For example, an IP address associated with a university can have more users than an IP address associated with a family home. Higher levels of user activity corresponding to a single IP address can be correlated to an increased risk for fraud and other malicious activity as compared to another IP address with less user activity. The counter associated with each IP address can keep track of the overall amount of different user access activity. When a counter for an IP address reaches a certain threshold value (i.e. increased user activity that can be more prone to fraudulent activity), the level of authentication can be increased as compared to the authentication implemented for user accesses via IP addresses with lower counter values. Additionally, in reaching this threshold value, a network device may not use that IP address as a part of the authentication process. In this manner, a counter can indicate an increased chance for fraudulent activity for a particular IP address, and an increased level of authentication can be implemented to counteract the increased chance for fraud. For counters of low value correlated to a smaller chance for fraudulent activity, increased authentication upon user access of stored data would not be needed. Thus, a network can be associated with a list of IP addresses from which various users access stored data via a user account, each IP address attributed with a counter, to provide varying levels of concurrent authentication for each IP address depending on each counter value.

There are technologies that help measure authentication risk from different perspectives. Many "bad" IP locations can be tracked and blocked by automated systems via black lists. Browser fingerprinting solutions can track device characteristics, including IP addresses, as a potential identifying factor for purposes of authenticating a user. Account credential attacks from a single IP address can be discovered and blocked with advanced logging techniques and processes.

The combination of matching user accounts with originating IP addresses that enables the measurement of the risk of the access of an IP address in real time to a particular enterprise can provide value in both risk assessment and seamless authentication systems. By actively managing a list of current originating contact IP addresses and cross linking them with actual client accounts, certain examples disclosed herein can determine whether a given IP address can be used as an authentication factor (e.g., a user connects from the same point repeatedly and only from that point), and can determine when a given IP address should not be used for authentication (e.g., a user is one of three hundred clients who connect from a given IP address). This information can then be used in a multifactor risk based authentication system to streamline client access while still providing security.

Using an IP address counter system can allow a network to allocate network resources more efficiently and appropriately while reducing fraudulent or malicious activity. Using an originating IP address as an identifying factor for purposes of authenticating a user and for determining a relative risk can allow for a lower level of network bandwidth usage to authenticate low risk user activity as compared to implementing a high level of authentication in all situations. By determining when a higher level of authentication is appropriate as indicated by a counter value, network resources can be better allocated to perform other processes, including authenticating a higher volume of user activity at any given time. Alleviating the need for increased authentication when user account activity is expected to be not fraudulent, low-risk, and secure, as indicated by a low counter value, can allow users to access stored data at higher speeds. Implementing a higher level of authentication for potentially at-risk or fraudulent user activity can allow a network to implement increased deterrence and security mechanisms more accurately and preemptively.

In some examples, browser settings can be stored in association with a user account when a user attempts to access stored information via an IP network. The browser settings can be recorded at a time prior to a user account login (e.g., during loading of the login page for entering user account name and password), during login when an account is being authenticated, or after a successful user login or authentication. Browser settings information that can be obtained and stored can include screen resolution, language, font type, zoom level, and cookie status. Additional information, such as device ID (e.g., MAC address), may be obtained and attributed to a specific user and user account. Browser information can be used in conjunction with an originating IP address as an identifying factor for purposes of authenticating a user and for determining the relative risk of user activity.

FIG. 1 is a block diagram of an example of a server device 100 usable for determining the relative risk for using an originating IP address as an identifying factor for purposes of authenticating a user. The server device 100 can be a network device as described in examples.

The server device 100 can include a processor 102, a bus 104, a network interface 118, and a memory 106. In some examples, the components shown in FIG. 1 (e.g., the processor 102, the bus 104, the network interface 118, and the memory 106) can be integrated into a single structure. For example, the components can be within a single housing. In other examples, the components shown in FIG. 1 can be distributed (e.g., in separate housings) and in electrical communication with each other.

The processor 102 can execute one or more operations for implementing some examples. The processor 102 can execute instructions stored in the memory 106 to perform the operations. The processor 102 can include one processing device or multiple processing devices. Non-limiting examples of the processor 102 include a Field-Programmable Gate Array ("FPGA"), an application-specific integrated circuit ("ASIC"), a microprocessor, etc.

The processor 102 can be communicatively coupled to the memory 106 via the bus 104. The non-volatile memory 106 may include any type of memory device that retains stored information when powered off. Non-limiting examples of the memory 106 include electrically erasable and programmable read-only memory ("EEPROM"), flash memory, or any other type of non-volatile memory. In some examples, at least some of the memory 106 can include a medium from which the processor 102 can read instructions. A computer-readable medium can include electronic, optical, magnetic, or other storage devices capable of providing the processor 102 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The network interface 118 can interface other network devices or network-capable devices to analyze and receive information related to a utilization of a network. Information received from the network interface 118 can be sent to the memory 106 via the bus 104. The memory 106 can store any information received from the network interface 118. For example, the network interface 118 may communicate with wireless communication equipment 120 (e.g., a wireless transceiver, cellular communication devices, etc.).

The memory 106 can include program code for determining the relative risk for using an originating IP address as an identifying factor for purposes of authenticating a user. The memory 106 can include program code for a data store module 108, control access module 110, and authentication level module 112. The data store module 108 can store a user's account information (e.g., username and password, security information), the most recently determined originating IP address and most recently determined browser settings. In some examples, the data store module 108 can store one or more previous originating IP addresses and one or more sets of previous browser information that have been replaced by a most recent originating IP address and a most recent set of browser settings. The control access module 110 can validate whether a user access attempt has been successfully authenticated after a user has entered the correct account login information. The authentication level module 112 can determine the level of authentication that should be applied to a user access attempt, where increased levels of authentication may be required during higher risk scenarios as described by examples. The authentication level module 112 can determine a threshold level of risk in which a higher level of authentication may be required (e.g., IP counter value reaches a certain threshold).

FIG. 1 illustrates a requesting device 130 that may be configured to make requests for access to data store module 108 to the server device 100. In one example, the requesting device includes a processor 132, a bus 134, and memory 142. The bus 134 may be coupled to input/output 140 or wireless network interface 136. The requesting device 130 may have an antenna 138 coupled to the wireless network interface 136. In other examples, the requesting device 130 may be connected via wired network interfaces and wired network connection ports. The requesting device 130 may include in memory 142 various browser settings/IP configuration data 144. The browser settings/IP configuration data 144 may be accessed by a browser application executable on the requesting device 130.

In some examples, the control access module 110 and the authentication level module 112 may be combined into an authentication determination subsystem 114. The authentication determination subsystem 114 may be local to the server device 100 or remotely accessed.

In other examples, a credential authentication system 116 authenticates the user according to the authentication level determined by the authentication determination subsystem 114. For example, the credential authentication system 116 may include a data storage 117 and a credential verification module 119. The data storage 117 may be configured to store multiple user credentials (e.g., username/password combinations, user certificates, digital signatures, etc.). The credential verification module 119 may perform authentication according to the authentication level determined by the authentication determination subsystem 114. For example, for a first authentication level, the credential verification module 119 may authenticate a request from the requesting device 130 based on the value associated with the IP address without requiring further authentication procedures. In another example, for a second authentication level, the credential verification module 119 may authenticate a request from the requesting device 130 based on the IP address and submission of a user credential (i.e., username/password combination, digital certificate, etc.). In yet another example, for a third authentication level, the credential verification module 119 may authenticate a request from the requesting device 130 by implementing a multi-factor authentication procedure. Some examples of the multi-factor authentication include a personal identification number (PIN) received on another device (e.g., via electronic mail, short message service, device push notifications, etc.). In some examples, the credential authentication system may be internal to the server device 100.

Figure 2:
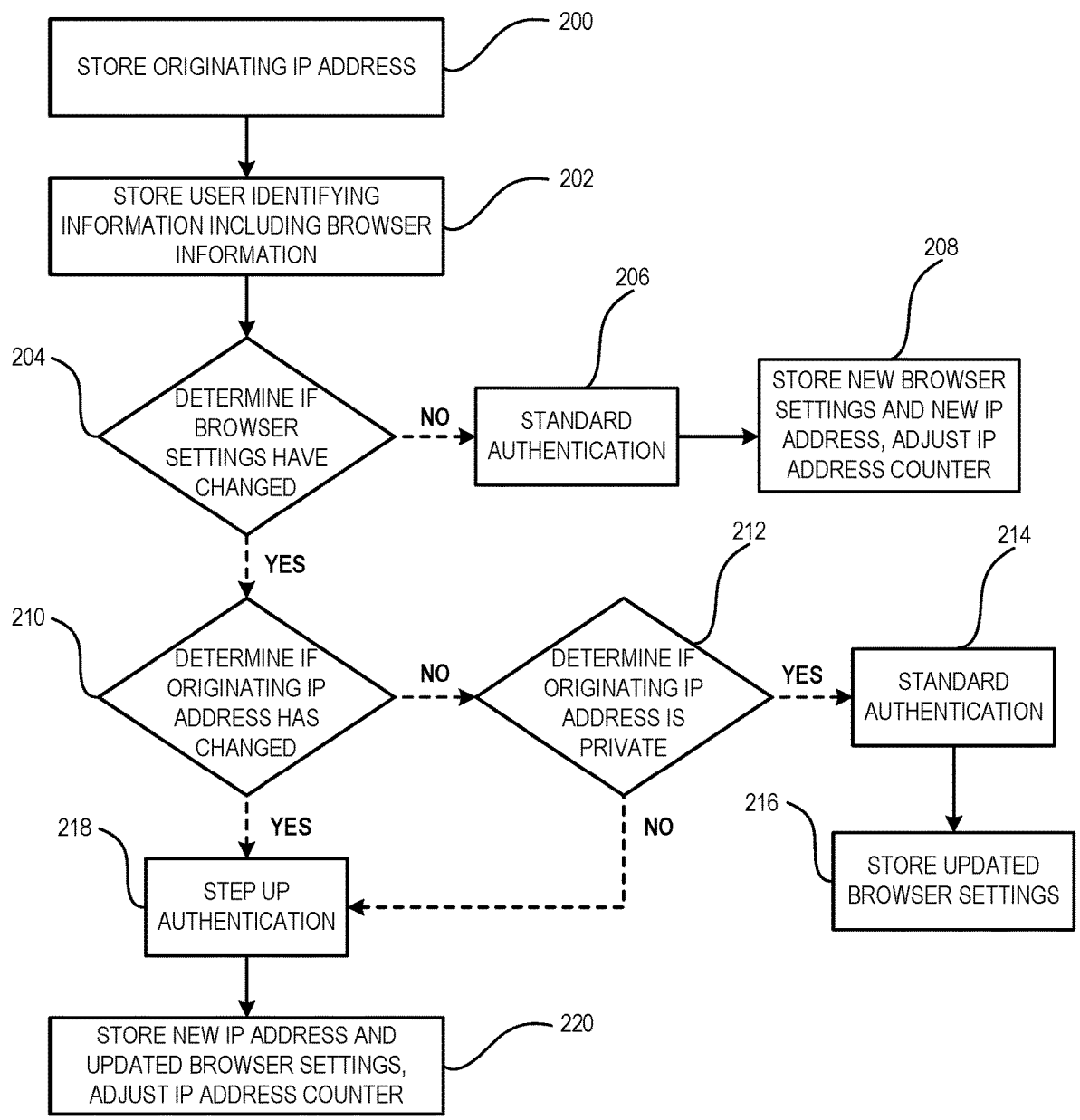
FIG. 2 is a flowchart of a process for determining the relative risk of a user by using an originating IP address as a factor for purposes of determining an authentication level for the user according to some aspects of the disclosure.

FIG. 2 is a flowchart describing a process for determining the relative risk for using an originating IP address as an identifying factor for purposes of authenticating a user. The technique described by FIG. 2 can provide both network protection and extra authentication information without specific user interaction.

In block 200, an originating IP address is determined and stored by a network device. A user can attempt to access stored information on a network, which can trigger a network device to initiate the processes shown in FIG. 2. Network devices located at the server level can capture an originating IP address prior to allowing access or a username and password exchange. The originating IP address can correspond to an IP address from which a user gains access to a network. For example, prior to entering username or password information, a network device can determine and store the IP address that is the source of a user's network traffic for comparison purposes in subsequent user access attempts.

In block 202, user identifying information including browser information is determined and stored by the network device. Storing browser settings for a particular computer when a user attempts to access stored data can allow for later comparison against browser settings that are recorded when the same user attempts to access the stored data again. The browser settings can be stored in association with the corresponding user account and other corresponding user information.

In some examples, determining whether browser settings recorded during one login attempt are different from or the same as browser settings recorded during a subsequent login attempt can be a useful indication of whether the subsequent login attempt was performed using a different device than the device used in the first login attempt. If the browser settings for both attempts were determined to be the same, this can be an indication that the originating IP address was the same during both login attempts, and therefore the subsequent login attempt may not require additional authentication. If the browser settings for both attempts were determined to be different, this can be an indication that the originating IP address may not be the same during both login attempts, and therefore the subsequent login attempt may be applied with additional authentication.

Browser settings can be useful in identifying whether a specific user is accessing stored information via the same device because there is a high likelihood that the browser settings have not changed since the last login attempt. Because there is a high likelihood that browser settings are different between any two or more devices on which a user may attempt a login, an access device that has the same browser settings as the previously used access device can be expected to be the same device. Assuming the browser information is exactly as recorded at the time of two consecutive logins, it may be assumed that (i) the originating IP address is the same for both access attempts, or (ii) the device used in each access attempt is the same device, where that device is a secure device authorized by a valid user. Thus, minimal procedures can be implemented to authenticate the device on a subsequent access attempt.

In block 204, the browser settings are analyzed to determine if the browser settings have changed. The browser settings as stored by the processes described in block 202 can be compared against previously stored browser settings associated with that specific user account. A network device, such as a server device, can determine if the browser settings have changed. If a user account has not been associated with browser information that has been stored by the network previously (e.g., a new user account), then the network device can authenticate the user account information via block 206 before storing the latest and only browser settings information associated with that user account in block 208.

For example, the browser settings can be obtained by using a JavaScript to detect browser settings through scripts that query various browser parameters. In some cases, the JavaScript can return multiple aspects about the browser or device. Examples include browser language, version, any stored cookie data, window size, device operating system, and other information relating to the browser and the device. In other examples, the server can detect browser settings by redirecting the browser from the original request through one or more uniform resource locator (URL) addresses that can obtain various parameters relating to the browser or device by passing variables gathered during server redirects for the browser.

Assuming the network device has stored recorded browser information prior to the latest user access attempt, the most recently recorded browser settings are compared against the second most recently recorded browser information. If the most recent browser settings are the same as the previous browser settings as known to the network device, the user account information is authenticated via block 206. The determination that the browser settings are the same can be an indication that the device is a secure, private device, and further verification processes as described in block 210 and onward may not be necessary.

For example, a user may attempt to login to an account at a private home computer that can include a number of specific browser settings that are unique to the home computer. The same user may then attempt to access the same account using the same private home computer. Here, assuming the user did not adjust the browser settings before the second access attempt, the browser settings can be determined to be the same, therefore indicating that minimal authentication of the user account and login process is needed. The user access attempt in this example can be subject to minimal authentication because it may be assumed that multiple accesses via a private home network are not subject to the same security issues that may be experienced when accessing stored data via a public access device on a public network.

If the most recent browser settings are different from the previous browser settings stored by the network device, further verification may be implemented via block 210 and onward. The determination that the browser settings are different can be an indication that the current access device may be a different device than the device used in the previous access attempt, where the current access device may not be secure or connected via a secure network.

For example, a user may attempt to login to an account at a private home computer that can include a number of specific browser settings that are unique to the home computer. The same user may then attempt to access the same account using a public computer at a library that has different browser settings than the user's private computer. Thus, analyzing whether the browser settings have changed upon each access attempt can indicate whether additional verification and authentication may be implemented. In this example, because the user is attempting to access stored information using a different computer, the network device can implement further verification processes described in block 210.

In block 208, new browser settings and new IP addresses are stored, and one or more IP address counters are adjusted. For examples in which the user account information as stored by the network device was not associated with any browser settings information, the new browser information can be stored by the network device in association with the user account information. In examples where the browser information determined in block 204 is the same as the previously stored browser information, the browser information stored in association with the user account information may not be updated.

If a new IP address, as stored in block 200, has not been detected and stored by the network device previously, the new IP address can be added to a list of IP addresses. Each IP address of the list of IP addresses can be associated with a counter that can track the number of users that have attempted to access stored information on the network via each IP address. For a new IP address, the corresponding counter can be incremented by 1 to indicate that one user has attempted to access stored data via that IP address. In some examples, for IP addresses that were previously included in the list of IP addresses, a subsequent access attempt by a same user on the same IP address may cause the counter to be decremented by 1 or to remain at the same value. If a user performs an access attempt using an IP address that is different from the IP address that user previously used, the counter for the previous IP address can be decremented by 1 and the counter for the different IP address can be incremented by 1. The IP address counter can provide a cumulative number of users that have performed access attempts on any given IP address while simultaneously providing an estimation of IP address utilization.

For example, a new user login session with a user ID of "IamAUser" can originate from originating IP address 1.2.3.4 using a PC-based Firefox web browser. The authentication system of the network device can store 1.2.3.4 as the most recent IP address for that user on that browser and add 1 to the total number of users at that IP address (e.g., 1.2.3.4 1). If that same user "IamAUser" logs in using the same type of browser from a different IP address, 1.2.3.5, then the new IP address can be stored, the new IP total number of users in the counter can be updated (e.g., 1.2.3.5 1) and the old IP address counter can be decremented by 1 (e.g., 1.2.3.4 0).

At any given time, the authentication level module and authentication systems of the network device can have access to a full spectrum of account-based traffic across all originating IP addresses. The combination of this information can then be used to measure relative authentication risk upon connection. In other words, an IP address list may look like the following:
IP 1.2.3.4-100 recently active sessions to BB&T (Acme University)
IP 5.6.7.8-5 active sessions (Public Coffee Shop)
IP 9.10.11.12-1 active session (Home Residence)

Active session information can be fed into a model that helps judge whether IP addresses are public or private. In the aforementioned example, the IP address for the Acme University has a large IP address counter indicating 100 users have attempted to access account information or are currently accessing account information. User access attempts using IP addresses with large counter values may be subject to further authentication processes as described in block 210 and onward assuming browser settings were determined to be different as described in block 204.

In block 210, the originating IP address is analyzed by the network device to determine if the originating IP address has changed. If the originating IP address has changed, additional authentication processes can be performed in block 218. For example, a user attempting to access stored data using a different browser setting on a different IP address (e.g., public library computer) can be subject to additional authentication. If the originating IP address has not changed, additional determinations described in block 212 can be performed to determine what level of authentication should be applied to the user access attempt.

The originating IP address used by new user accounts associated would not be analyzed in block 210 since the corresponding IP address and new browser information would have been processed according to the processes described in blocks 204, 206, and 208.

In block 212, the originating IP address is analyzed by the network device to determine if the originating IP address is private. Private IP addresses, which can be more secure, can help measure authentication risk and can be used as a proxy form of identification. If the originating IP address is determined to be private, then standard authentication can be performed via block 214. If the originating IP address is determined to be public as opposed to private, then additional authentication processes can be performed via block 218.

In block 216, updated browser settings are stored by the network device and associated with the corresponding user account. Processes described in block 216 can be performed when a user access attempt is performed on a device with different browser settings, but using the same private IP address. For example, a user on a home desktop may have adjusted the browser settings, or the same user attempts to login to their account on the same private IP address at home using a mobile device instead of the previously used desktop. In these examples, additional authentication may not be implemented.

In block 220, browser settings are updated, new IP addresses are stored, and one or more IP address counters are adjusted. Assuming the originating IP address has changed as described in block 210 or the originating IP address was determined to be public as described in block 212, the processes described in block 220 can be performed after additional authentication via block 218. After a successful login attempt, a new IP address and updated browser settings can be stored in association with the user account. Further, similar to the process described in block 208, the IP address counter for each IP address from the list of IP addresses can be incremented or decremented accordingly based on user access activity.

Figure 3:
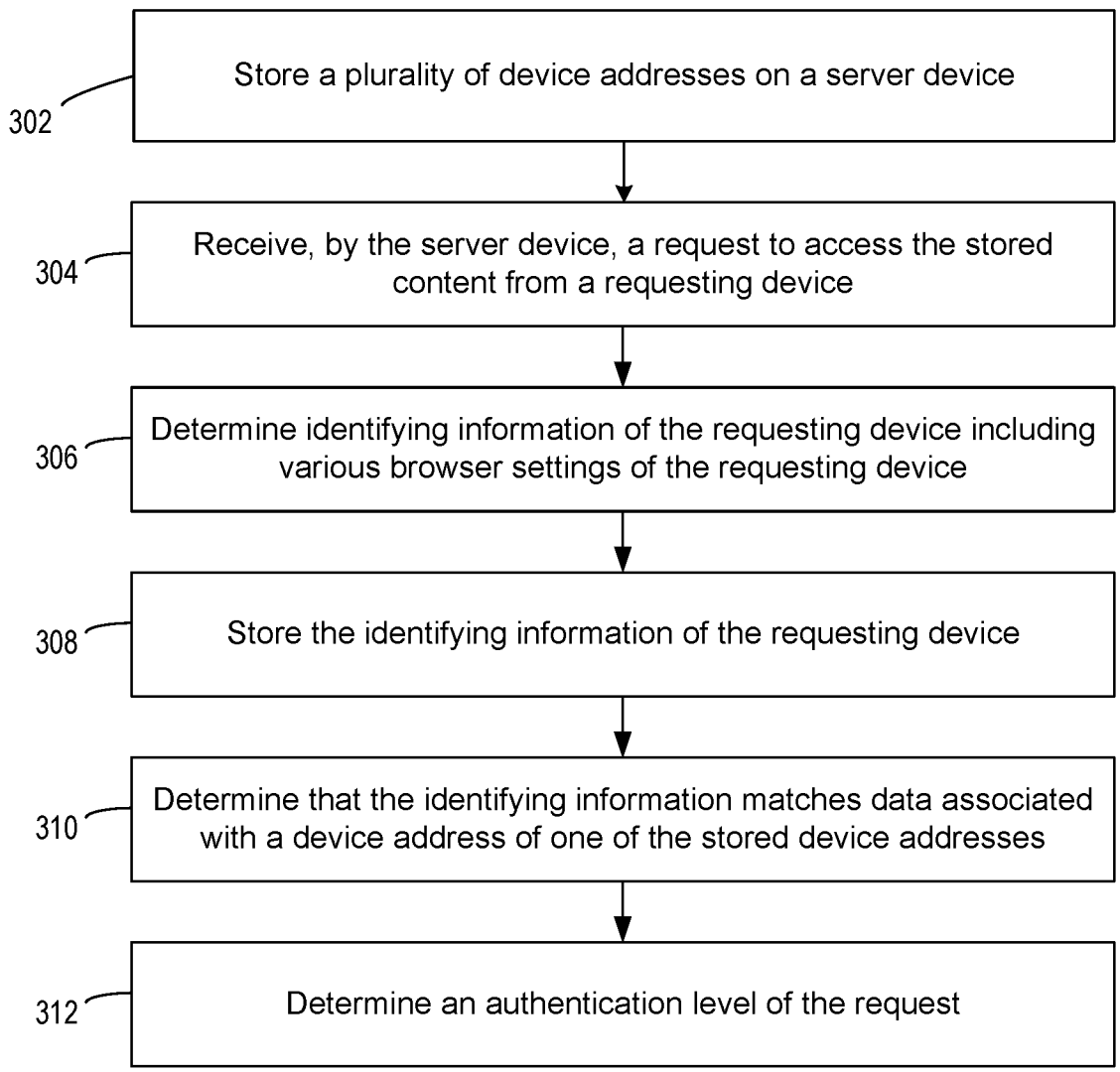
FIG. 3 is a flowchart of a process for determining an authentication level for a request according to some aspects of the disclosure.

FIG. 3 is a flowchart of a process 300 for determining an authentication level for an IP address, according to some aspects of the disclosure. The technique described by FIG. 3 can determine identifying information about the requesting device, compare the identifying information with previously authentications, and determine an authentication level according to the level of determined risk.

In block 302, the process 300 involves storing a plurality of device addresses on a server device. In one example, the server device 100 may store a plurality of device addresses (e.g., IP address, MAC address, etc.) for devices that have previously been authenticated to access the data store module 108. The device addresses may be stored in any suitable storage manner (e.g., encrypted database, hashing, plain text, etc.).

In block 304, the process 300 involves receiving, by the server device, a request to access the stored content from a requesting device. For example, the server device 100 may receive a request from requesting device 130 to access the data store module 108. The server device 100 may receive the request from requesting device 130 via a network interface 118. The requesting device 130 may send the request to the server device 100 via wireless network interface 136. In one example, the request may be an HTTP request to open a transmission control protocol or internet protocol (TCP/IP) channel to the server for access to the location of the data store module 108, however, other types of requests for access are possible.

In block 306, the process 300 involves determining identifying information for the requesting device including various browser settings of the requesting device. For example, various browser settings can be obtained by using a JavaScript or reading stored cookie data to detect browser settings. In some cases, the JavaScript or the cookie data includes settings that relate to multiple aspects about the browser or device. Examples include browser language, version, any stored cookie data, window size, device operating system, and other information relating to the browser and the device.

In block 308, the process 300 involves storing the identifying information of the requesting device. For example, the server device 100 may store the various browser settings or other data relating to the requesting device 130. In one example, the server device 100 may store the identifying information of the requesting device 130 in the data store module 108. The identifying information may include device address, browser settings, timestamp, geolocation, or other data relating to the requesting device 130.

In block 310, the process 300 involves determining that the identifying information matches data associated with a device address of one of the stored device addresses. For example, the server device 100 may be configured to perform an operation or execute an application (e.g., authentication level module 112) that compares the identifying information associated with the requesting device 130 with identifying information associated with previous requests and stored device addresses. In one example, the authentication level module 112 determines the IP address and browser settings from the identifying information of the requesting device 130. The authentication level module 112 may compare the IP address with stored IP addresses in the data store module 108. The authentication level module 112 may determine that the IP address matches (e.g., exact match or determined match) one of the stored IP addresses. The authentication level module may compare other aspects of the identifying information, such as the browser settings with stored browser settings associated with the stored IP address that matched the IP address.

In some examples, the authentication level module 112 may determine that one or more of the browser settings matches the stored browser settings. The authentication level module 112 may determine a percentage of browser settings that match, or determine that a threshold number of browser settings match, between the browser settings associated with the requesting device 130 and the stored browser settings. In other examples, the authentication level module 112 may determine that the browser settings associated with the requesting device 130 do not match the stored browser settings. For instance, the comparison resulted in a percentage match between the browser settings associated with the requesting device 130 and the stored browser settings was below a predetermined level corresponding with a "match."

In block 312, the process 300 involves determining an authentication level of the request. For instance, the authentication level module 112 may select an authentication level for the request based on factors as described with regards to FIGS. 1-3. For example, the authentication level module 112 may select a level of authentication based on the value associated with the IP address, the match between the IP address associated with the requesting device 130, or the browser settings of the requesting device 130. The authentication level may correspond to various authentication protocols.

In one example, the authentication level module 112 may select a first authentication level based on the value associated with the IP address. In this example, the IP address associated with the requesting device 130 may be used to access the stored data store module 108 consistently. Accordingly, the server device 100 may increment the value associated with the IP address for each successful authentication of the IP address. The authentication level module 112 may determine that if the value associated with the IP address exceeds a particular value (e.g., the requesting device corresponds to the same IP address a number of times), that the requesting device 130 may be granted access to the data store module 108 without any further verification of the requesting device or user (e.g., the user would not need to be prompted for authentication credentials).

In another example, the authentication level module 112 may select a second authentication level based on matching the IP address with a recorded IP address from a previous authentication of the user (e.g., the IP address of the requesting device matches a stored IP address). In this example, the IP address associated with the requesting device 130 may have a value associated with the IP address that is below the particular value associated with the first authentication level. The authentication level module 112 may determine that a higher level of authentication than the first authentication level is necessary to verify that the requesting device 130 is associated properly with the user. The authentication level module 112 may determine that the IP address associated with the requesting device 130 matches a stored IP address in data store module 108. The authentication level module 112 may determine that the requesting device 130 can authenticate at the second authentication level and increment the value associated with the IP address.

In yet another example, the authentication level module 112 may select a third authentication level based on matching the IP address and identifying information including browser settings with a recorded IP address and stored identifying information, including browser settings from a previous authentication of the user. In this example, the IP address associated with the requesting device 130 may have a value associated with the IP address that is below the particular value associated with the first authentication level or the IP address. The authentication level module 112 may determine that a higher level of authentication than the first authentication level and the second authentication level is necessary to verify that the requesting device 130 is associated properly with the user. The authentication level module 112 may determine that the browser settings associated with the IP address match stored browser settings associated with the recorded IP address. The authentication level module 112 may also determine that the IP address matches the recorded IP address or determine that additional authentication measures are needed. Examples of additional security measures that may be required by the server device 100 for the third authentication level may include two-factor authentication, security question, or other additional authentication measures that may be used to improve accuracy of authentication and reduce a likelihood that the request is fraudulent.

While certain aspects of this disclosure have described requests and interactions with regard to IP address, it should be understood that other addresses (e.g., MAC address, telephone number, or other network address) identifying a device executing a browser may also be used to determine an authentication level for a user.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

The invention claimed is:

1. A system comprising:
a processing device; and
a memory device including instructions executable by the processing device for causing the processing device to:
increment a value associated with a first IP address in response to a request by a user from the first IP address to access an entity, wherein the value is incremented in response to the request independently of first authentication information supplied by the user with the request;
decrement the value associated with the first IP address in response to a subsequent request by the user from a second IP address to access the entity, wherein the second IP address is different from the first IP address, wherein the value is decremented in response to the subsequent request independently of second authentication information supplied by the user with the subsequent request;
use the value associated with the first IP address to select an authentication level for the user, wherein the authentication level is selected from among a plurality of authentication levels of increasing difficulty, wherein higher authentical levels of the plurality of authentication levels involve more rigorous authentication procedures than lower authentication levels of the plurality of authentication levels;
compare user identifying information associated with the first IP address with a recorded set of user identifying information, the user identifying information being different from the first IP address and the first authentication information, the user identifying information including browser settings, wherein the recorded set of user identifying information is associated with a stored IP address, and wherein the stored IP address is associated with a previous authentication of the user;
determine whether the user identifying information associated with the first IP address matches the recorded set of user identifying information associated with the stored IP address;
in response to determining that the user identifying information associated with the first IP address matches the recorded set of user identifying information associated with the stored IP address, increment the value associated with the first IP address; and
in response to determining that the user identifying information associated with the first IP address does not match the recorded set of user identifying information associated with the stored IP address, store the user identifying information and decrement the value associated with the first IP address.

2. The system of claim 1, wherein the plurality of authentication levels include at least:
a first authentication level;
a second authentication level that involves a higher level of authentication as compared to the first authentication level; and
a third authentication level that involves a higher level of authentication as compared to the first authentication level and the second authentication level.

3. The system of claim 2, wherein the first authentication level is associated with a procedure for authenticating the user without requiring the user to provide further information beyond the first IP address.

4. The system of claim 3, wherein the second authentication level is associated with a procedure for authenticating the user by matching authentication credential information received from the user to stored credential information without requiring a multi-factor authentication procedure.

5. The system of claim 4, wherein the third authentication level is associated with a procedure for authenticating the user using a multi-factor authentication procedure.

6. The system of claim 1, wherein the instructions are further executable by the processing device or a different processing device to:
determine that the first IP address matches the stored IP address by matching at least a portion of the first IP address with a portion of the stored IP address; and
determine that the first IP address does not match the stored IP address by lacking a match of at least a portion of the first IP address with a portion of the stored IP address.

7. The system of claim 2, wherein the instructions are further executable by the processing device or a different processing device to:
determine that the first IP address is different than the stored IP address associated with the previous authentication of the user; and
based on determining that the first IP address is different than the stored IP address, determine an updated authentication level for the user.

8. The system of claim 7, wherein the instructions are further executable by the processing device or a different processing device to:
determine that the first IP address is a public IP address; and
based on determining that the first IP address is a public IP address, determine that the updated authentication level is the third authentication level.

9. The system of claim 1 further comprising:
a credential authentication system comprising a data store configured to store a plurality of user authentication credentials, wherein the credential authentication system is configured to seek to authenticate user using procedures in accordance with the authentication level.

10. A method comprising:
storing, by a processing device, a plurality of IP addresses with which users have made requests to access an entity;
incrementing, by the processing device, a value associated with a first IP address in response to a request by a user from the first IP address to access an entity, wherein the value is incremented in response to the request independently of first authentication information supplied by the user with the request;
decrementing, by the processing device, the value associated with the first IP address in response to a subsequent request by the user from a second IP address to access the entity, wherein the second IP address is different from the first IP address, wherein the value is decremented in response to the subsequent request independently of second authentication information supplied by the user with the subsequent request;

selecting, by the processing device, an authentication level for the user based on the value associated with the first IP address, wherein the authentication level is selected from among a plurality of authentication levels of increasing difficulty, wherein higher authentical levels of the plurality of authentication levels involve more rigorous authentication procedures than lower authentication levels of the plurality of authentication levels;

comparing user identifying information associated with the first IP address with a recorded set of user identifying information, the user identifying information being different from the first IP address and the first authentication information, the user identifying information including browser settings, where in the recorded set of user identifying information is associated with a stored IP address, and wherein the stored IP address is associated with a previous authentication of the user;

determining whether the user identifying information associated with the first IP address matches the recorded set of user identifying information associated with the stored IP address; and in response to determining that the user identifying information does not match the recorded set of user identifying information, storing the user identifying information and decrementing the value.

11. The method of claim 10, wherein the plurality of authentication levels include at least:

a first authentication level;

a second authentication level that involves a higher level of authentication as compared to the first authentication level; and a third authentication level involves a higher level of authentication as compared to the first authentication level and the second authentication level.

12. The method of claim 11, wherein the first authentication level is associated with a procedure for authenticating the user without requiring the user to provide further information beyond the first IP address.

13. The method of claim 12, wherein the second authentication level is associated with a procedure for authenticating the user by matching authentication credential information received from the user to stored credential information without requiring a multi-factor authentication procedure.

14. The method of claim 13, wherein the third authentication level is associated with a procedure for authenticating the user using a multi-factor authentication procedure.

15. The method of claim 14, wherein the multi-factor authentication procedure requires the user to enter information into a second device distinct from a first device used to request access to the entity.

16. The method of claim 10, further comprising:

determining that the first IP address matches the stored IP address by matching at least a portion of the first IP address with a portion of the stored IP address; or determining that the first IP address does not match the stored IP address by lacking a match of at least a portion of the first IP address with a portion of the stored IP address.

17. The method of claim 10, further comprising:

determining that the first IP address is different than the stored IP address associated with the previous authentication of the user; and determining an updated authentication level for the user.

18. A non-transitory computer-readable medium comprising program code that is executable by a processing device for causing the processing device to:

compare user identifying information associated with a first IP address with a recorded set of user identifying information, the user identifying information including browser settings, wherein the recorded set of user identifying information is associated with a stored IP address, and wherein the stored IP address is associated with a previous authentication of the user;

determine whether the user identifying information matches the recorded set of user identifying information;

in response to determining that the user identifying information matches the recorded set of user identifying information, increment a value associated with the first IP address;

in response to determining that the user identifying information does not match the recorded set of user identifying information, store the user identifying information and decrement the value; and use the value associated with the first IP address to determine an authentication level for a user, wherein the authentication level is selected from among a plurality of authentication levels of increasing difficulty, wherein higher authentical levels of the plurality of authentication levels involve more rigorous authentication procedures than lower authentication levels of the plurality of authentication levels.

* * * * *